(12) United States Patent
Kapur et al.

(10) Patent No.: US 8,639,793 B2
(45) Date of Patent: Jan. 28, 2014

(54) DISASTER RECOVERY AND AUTOMATIC RELOCATION OF CLOUD SERVICES

(75) Inventors: Sukhdev S. Kapur, Saratoga, CA (US); Ethan M. Spiegel, Mountain View, CA (US); Subrata Banerjee, Los Altos, CA (US); Sumeet Singh, Saratoga, CA (US); Ashok Ganesan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 142 days.

(21) Appl. No.: 13/040,629

(22) Filed: Mar. 4, 2011

(65) Prior Publication Data

US 2012/0110186 A1 May 3, 2012

Related U.S. Application Data

(63) Continuation-in-part of application No. 12/915,531, filed on Oct. 29, 2010.

(51) Int. Cl.
*G06F 15/173* (2006.01)

(52) U.S. Cl.
USPC ............ 709/223; 709/220; 709/226; 709/229

(58) Field of Classification Search
USPC ................................. 709/220, 223, 226, 229
See application file for complete search history.

(56) References Cited

U.S. PATENT DOCUMENTS

| | | | |
|---|---|---|---|
| 7,200,589 B1 | 4/2007 | Graupner | |
| 7,457,835 B2 | 11/2008 | Toebes et al. | |
| 7,543,020 B2 | 6/2009 | Walker et al. | |
| 7,634,566 B2 | 12/2009 | Turner et al. | |
| 7,747,720 B2 | 6/2010 | Toebes et al. | |
| 7,752,311 B2 | 7/2010 | Walker et al. | |
| 7,870,420 B2 | 1/2011 | Lloyd et al. | |
| 8,255,529 B2 | 8/2012 | Ferris et al. | |
| 8,271,653 B2 | 9/2012 | DeHaan | |
| 2005/0283645 A1 | 12/2005 | Turner et al. | |
| 2006/0179106 A1 | 8/2006 | Turner et al. | |

(Continued)

FOREIGN PATENT DOCUMENTS

WO 2004110023 A1 12/2004

OTHER PUBLICATIONS

Nguyen Hoang et al., "Detecting Anomalies by Data Aggregation in the Power Grid", University of Illinois, Computer Science Research and Tech Reports, Jul. 2006, 10 pages.

(Continued)

*Primary Examiner* — Phuoc Nguyen
(74) *Attorney, Agent, or Firm* — Edell, Shapiro & Finnan, LLC

(57) ABSTRACT

Techniques are provided to move the services performed on one device to another device in a cloud computing system for a variety of reasons including failure, maintenance or upgrade of the device. A notification is received that services performed by an impacted device in a domain of a plurality of hierarchical domains need to be moved. A determination is made as to whether there are replacement resources available in the domain to perform the services, and if so, the replacement resources are automatically rendered to perform the services. The process continues to higher level domains that have a view into the capabilities of subordinate domains in order to determine where to move the services within the cloud computing system.

21 Claims, 15 Drawing Sheets

(56) References Cited

U.S. PATENT DOCUMENTS

| | | |
|---|---|---|
| 2008/0238919 A1 | 10/2008 | Pack |
| 2008/0256549 A1 | 10/2008 | Liu et al. |
| 2009/0287825 A1 | 11/2009 | Walker et al. |
| 2010/0223378 A1* | 9/2010 | Wei .................... 709/224 |
| 2010/0223382 A1 | 9/2010 | Rayes et al. |
| 2010/0228819 A1* | 9/2010 | Wei .................... 709/203 |
| 2010/0250668 A1 | 9/2010 | Toebes et al. |
| 2010/0287280 A1* | 11/2010 | Sivan .................... 709/226 |
| 2011/0022642 A1 | 1/2011 | deMilo et al. |
| 2011/0066728 A1 | 3/2011 | Gauthier et al. |
| 2011/0126197 A1 | 5/2011 | Larsen et al. |
| 2011/0137805 A1 | 6/2011 | Brookbanks et al. |
| 2011/0138050 A1 | 6/2011 | Dawson et al. |
| 2011/0145439 A1 | 6/2011 | Chaturvedi et al. |
| 2011/0179132 A1 | 7/2011 | Mayo et al. |
| 2011/0295998 A1 | 12/2011 | Ferris et al. |
| 2011/0320605 A1 | 12/2011 | Kramer et al. |
| 2012/0005236 A1 | 1/2012 | Deng et al. |
| 2012/0030343 A1* | 2/2012 | Ryder .................... 709/224 |
| 2012/0054332 A1 | 3/2012 | Sahu et al. |
| 2012/0054345 A1 | 3/2012 | Sahu et al. |
| 2012/0054626 A1 | 3/2012 | Odenheimer |
| 2012/0060165 A1 | 3/2012 | Clarke |
| 2012/0311144 A1 | 12/2012 | Akelbein et al. |
| 2013/0138619 A1 | 5/2013 | Krislov |

OTHER PUBLICATIONS

Rich Miller, "Can Amazon be A Player in Disaster Recovery?", Data Center Knowledge, Mar. 12, 2009, pp. 1-8.

Rich Miller, "How Google Routes Around Outages", Data Center Knowledge, Mar. 25 2009, pp. 1-12.

* cited by examiner

DISASTER RECOVERY AND AUTOMATIC RELOCATION OF CLOUD SERVICES

CROSS REFERENCE TO RELATED APPLICATION

This application is a continuation-in-part of U.S. application Ser. No. 12/915,531, filed Oct. 29, 2010, the entirety of which is incorporated herein by reference.

TECHNICAL FIELD

The present disclosure relates to cloud computing systems.

BACKGROUND

In a cloud computing environment, numerous cloud service requests are serviced in relatively short periods of time. In such an environment, it is highly beneficial to automate placement, rendering, and provisioning of cloud services within and between data centers, so that cloud service requests can be accommodated dynamically with minimal (and preferably no) human intervention.

Examples of cloud services include: compute services, network services, and storage services. Examples of network services include Layer 2 (L2) virtual local area network (VLAN) or Layer 3 (L3) virtual routing and forwarding (VRF) connectivity between various physical and logical elements in a data center, Layer 4 (L4) to Layer 7 (L7) services including firewalls and load balancers, Quality of Service (QoS), access control lists (ACLs), and accounting.

Network management of cloud computing systems currently use orchestration tools which learn about all cloud elements within the data center, make all placement decisions for all cloud elements within the data center, and render and provision the cloud service request by communicating directly with each cloud element in the data center. Due to the wide variety of functionality and implementations within the data center, such orchestration tools need to be highly customizable and flexible so that they can utilize the wide array of management interfaces provided by various cloud elements. Considerable effort is required to make the orchestration tools properly interface with new implementations of cloud elements within the data center, leading to significant time delays before new features provided by the cloud elements can be managed by the orchestration tools. These orchestration tools have great difficulty scaling to large cloud environments.

In current cloud computing environments, failures require manual re-provisioning of services. Depending upon the failures, the service outage could be in the order of hours, days, or even weeks.

DESCRIPTION OF EXAMPLE EMBODIMENTS

Overview

Techniques are provided to move the services performed on one device to another device in a cloud computing system for a variety of reasons including failure, maintenance or upgrade of the device. A notification is received that services performed by a device (referred to as an "impacted" device) in a domain of a plurality of hierarchical domains need to be moved. A determination is made as to whether there are replacement resources available in the domain to perform the services of the impacted device, and if so, the other resources are automatically rendered to perform the services.

Example Embodiments

Figure 1:
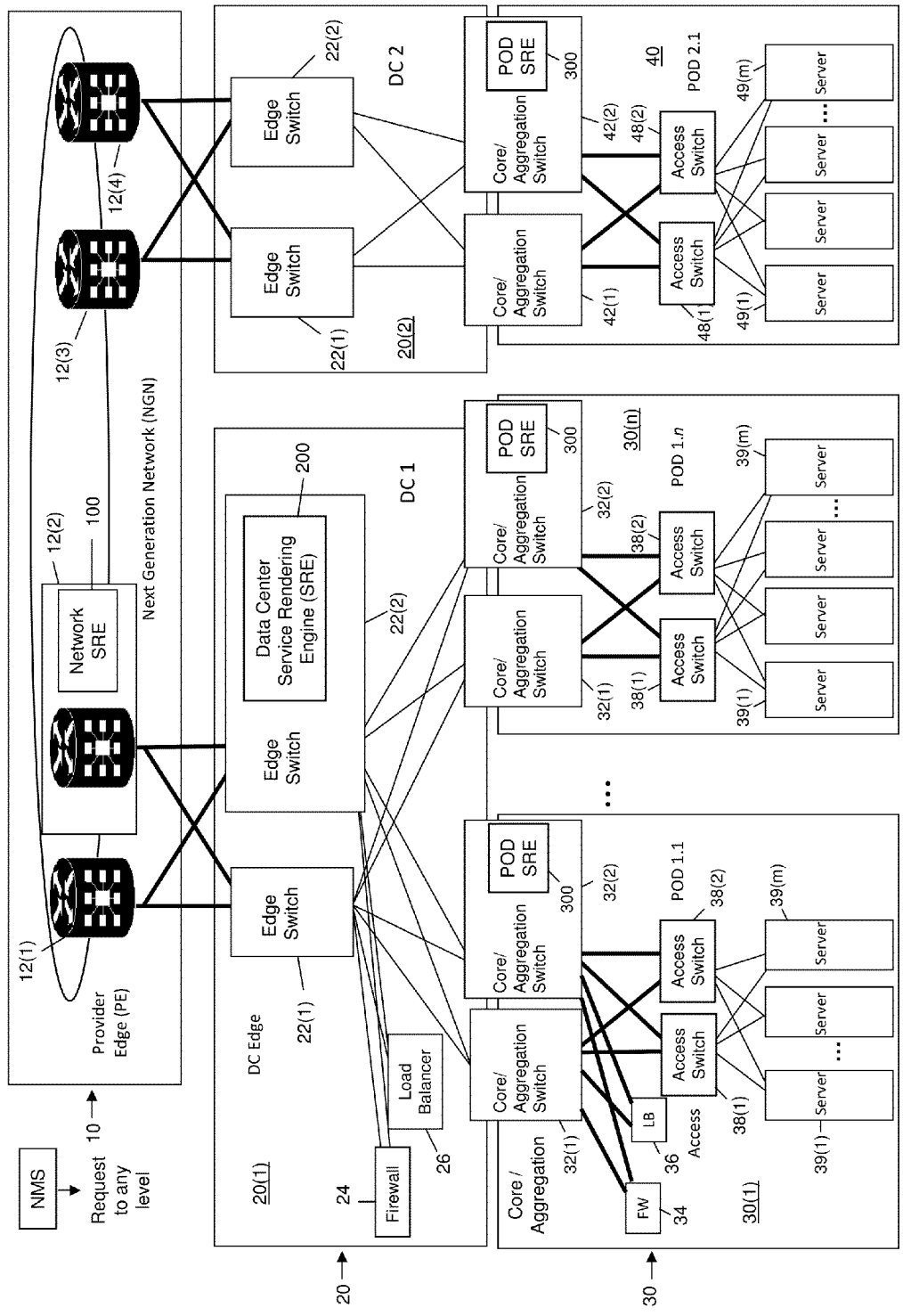
FIG. 1 is an example of a block diagram of a cloud computing system employing distributed hierarchical rendering and provisioning of cloud services.

Referring first to FIG. 1, an example of a cloud computing system or environment is shown at 5. The system is configured with a distributed hierarchical mechanism for servicing policy-based cloud service requests. The system 5 comprises a plurality of hierarchical levels. The highest level is a network level 10, also referred to herein as a Next Generation Network (NGN) level. The next highest level is a data center (DC) level 20. Beneath the data center level 20 is a POD level 30. While FIG. 1 shows three levels in the hierarchy, this is only an example, as there may be additional levels. There are cloud elements in each hierarchical level. The cloud elements may comprise switches, routers, load balancers, firewalls, servers, network appliance or any device that is involved in providing a function to a cloud service request. For simplicity, the term "cloud element" is meant to encompass any of these devices.

The policy-based cloud service requests progress through a set of distributed hierarchical service rendering engines (SREs). The network level 10 connects multiple different data centers at the data center level 20, e.g., data center 20(1) labeled as DC 1 and data center 20(2) labeled as DC 2, and subsets of the data centers called "PODs" that are centered on aggregation switches within the data center. Again, the number of levels shown in FIG. 1 is an example. It is possible to deploy an arbitrary number of levels of hierarchy, possibly with different definitions than in this example. The hierarchy may follow the physical topology of the network but it is not required.

At each level of the hierarchy, there is at least one service rendering engine. In the network level 10, there are Provider Edge (PE) devices that perform routing and switching functions. FIG. 1 shows four PE devices 12(1)-12(4) as an example. A network service rendering engine is shown at 100 as part of the PE 12(2). At the data center level 20, there are edge switches, firewalls and load balancers. For example, in a first data center 20(1) labeled "DC 1" in FIG. 1, there are edge switches 22(1) and 22(2), a firewall device 24 and a load balancer device 26. The PEs 12(1) and 12(2) in the network level 10 are each connected to the edge switches 22(1) and 22(2). A data center service rendering engine (SRE) 200 is part of the edge switch 22(2) in data center 20(1). The data center SRE 300 may be hosted in other networking elements in the data center or in one or more virtual machines running on servers in the data center. In another form, the data center SRE functionality may be distributed across multiple devices in the POD. The edge switches 22(1) and 22(2) are each connected to the firewall device 24 and load balancer device 26. Similarly, in data center 20(2), there are edge switches 22(1) and 22(2), and also a firewall device and a load balancer device. The firewall and load balancer devices in data center 20(2) are not shown in FIG. 1 for simplicity. Switch 22(2) in data center 20(2) includes a data center service rendering engine 200 as well.

At the POD level 30, there are core/aggregation switches, firewalls, load balancers and web/application servers in each POD. The functions of the firewalls, load balancers, etc., may be hosted in a physical chassis or they may be hosted in a virtual machine executed on a computing element in the POD level 30. PODs 30(1)-30(n), labeled "POD 1.1"-"POD 1.n", are connected to data center 20(1) and POD 40 is connected to data center 20(2). Thus, PODs 30(1)-30(n) may be viewed as different processing domains with respect to the data center 20(1), and the data center service rendering engine 200 in the edge switch 22(2) may select which one (or more) of a plurality of processing domains in the POD level to be used for aspects of a cloud service request that the data center service rendering engine 200 receives. Data center 20(2) cannot select one of the PODs 30(1)-30(n) because they are in different processing domains, but data center 20(2) can select POD 40. In each of PODs 30(1)-30(n), there are core/aggregation switches 32(1) and 32(2), one or more firewall (FW) devices 34, one or more load balancer (LB) devices 36, access switches 38(1) and 38(2) and servers 39(1)-39(m). The firewall and load balancers are not shown in POD 30(n) for simplicity. The servers 39(1)-39(m) each run one or more virtual machine processes, i.e., virtual servers. There is a POD SRE 300 in core/aggregation switch 32(2) in each of PODs 30(1)-30(n). The POD SRE 300 may be hosted in other networking elements in the POD or in one or more virtual machines running on servers in the POD. In another form, the POD SRE functionality may be distributed across multiple devices in the POD. Similarly, in POD 40 there are core/aggregation switches 42(1) and 42(2), access switches 48(1) and 48(2) and servers 49(1)-49(m). There is a POD service rendering engine 300 in core/aggregation switch 42(2). POD 40 also includes one or more firewalls and load balancers but they are omitted in FIG. 1 for simplicity.

Network management stations/orchestration tools external to the cloud computing system 5 transmit policy-based cloud service requests to one or more service rendering engines. That service rendering engine is responsible for all interactions with the external network management stations/orchestration tools regarding that cloud service request. An example of an external network management station (NMS) is shown at 50 in FIG. 1. The NMS 50 may transmit a request to any level of the hierarchy of the cloud computing system 5. The cloud service request is handled from that level downward or from that level upward in the hierarchy. For example, if the network management station chooses to interact with service rendering engines at the data center level 10, then the network will handle placement decisions, rendering, and provisioning throughout the data center level 20 and POD level 30. In this case, the NMS 50 separately handles network level placement decisions (e.g., selection of the data center) and rendering and provisioning, e.g., virtual private network (VPN) extension to the selected data center.

The service rendering engine for any given hierarchical level is responsible for making placement decisions, rendering, and provisioning within its domain in its hierarchical level. This includes selection of one or more child domains in the next child (lower) hierarchical level for placement of cloud services or selection of one or more parent domains in the next parent (higher) hierarchical level for placement of cloud services, but does not include (knowledge of) details of placement, rendering, and provisioning within the child domain (or in the parent domain). Additional service rendering engines may be enabled in order to provide high availability and possibly in order to distribute processing load. In an active/standby approach, there is more than one service rendering engine for a particular domain and one of the service rendering engines is considered active and receives and responds to policy-based cloud service requests. The active service rendering engine checkpoints, i.e., registers, its state to any standby service rendering engines for the same domain. If the active service rendering engine goes down, then a standby service rendering engine will statefully transition to the active role and quickly resume processing of policy-based cloud service requests. In another approach, multiple service rendering engines for the same domain share a common distributed database containing all state information related to policy-based cloud service requests. This approach allows for policy-based cloud service requests to be load balanced across the multiple service rendering engines.

The cloud computing system 5 may be configured to employ recursive abstraction and normalization with respect to service rendering and placement mechanisms. At a bottom level of the hierarchy, there is collection of devices that comprises the POD. At the next level up, the POD is treated as if it were one device, like one large computer with numerous capabilities.

There are a plurality of layers of abstraction, a placement mechanism that takes place in each layer, policy elements, and interpretation of policy. Each layer provides abstraction and normalization with respect to service rendering and placement mechanisms. In other words, the determination as to where to place a cloud service request is based on normalized information representing capabilities of devices in a given hierarchical (e.g., first level) and another (e.g., second) hierarchical level.

Each layer can be non-homogeneous. For example, each layer can have its own policy rendering mechanism and its own placement mechanisms that apply to the level of abstraction provided by the immediate underlying layer. At each layer, the placement decisions are based on normalized information from a layer below. Once placed at the layer below, similar operations are performed at the layer below. Thus, this process is recursive from layer to layer, but within a given layer, the rendering and provisioning mechanisms may be different from each other.

Figure 2:
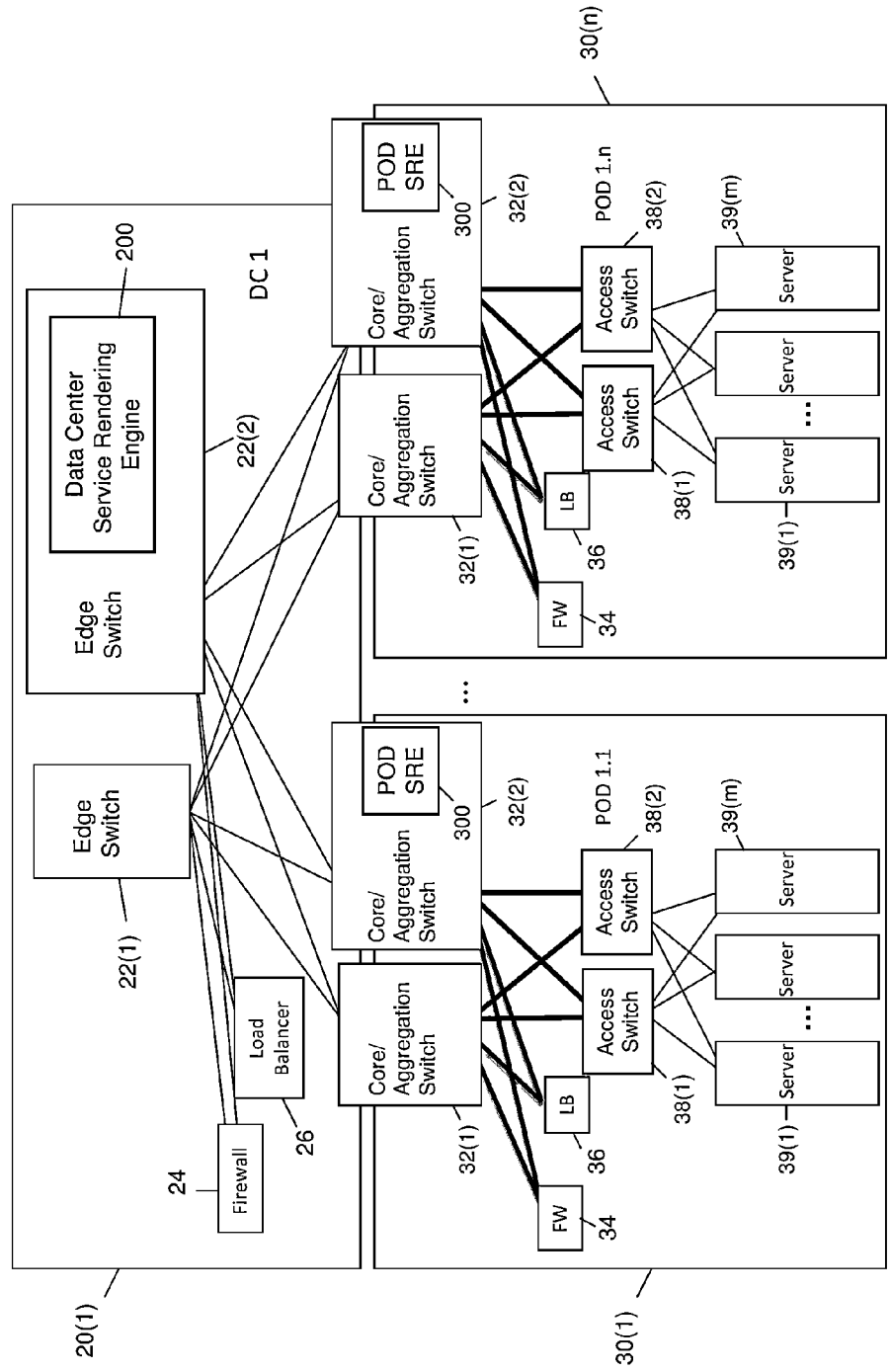
FIG. 2 is an example of a diagram depicting a network view from the perspective of a service rendering engine in a data center hierarchical level.

The network view from the perspective of a data center service rendering engine is shown in FIG. 2, for example with respect to the data center service rendering engine 200 in edge switch 22(2) of data center 20(1). Based on the details of the policy-based cloud service request and the data center service rendering engine's knowledge of the data center domain topology, capabilities, and resources, the data center service rendering engine 200 makes a placement decision. The data center service rendering engine 200 determines that some aspects of the cloud service request are to be satisfied at the data center level, for example utilizing a firewall hanging off a data center edge switch. These aspects are rendered and provisioned by the data center service rendering engine 200 in cooperation with the cloud elements within the data center domain. The remaining aspects of the cloud service request are placed in one or more specific PODs, though the data center service rendering engine 200 does not placed them in specific cloud elements within the POD. The data center service rendering engine 200 passes the policy-based service request to the POD service rendering engines 300 for the selected PODs, for placement, rendering, and provisioning within those PODs. The policy-based request is either filtered before forwarding, or is marked so that the portions of the policy-based cloud service request relevant to the specific POD can be identified. In other words, the forwarded cloud service request is a subset of the original cloud service request, either by way of filtering or by way of marking/indicating those portions of the original request that are relevant to the POD service rendering engine 300 that receives it. The DC-level SRE may also add policies to the request that the DC-level SRE wants the POD level SRE to help enforce even though it may not be part of the original policy-based cloud service request.

The terminology "aspects of the cloud service request" refers to features or functions of one or more cloud elements to support or implement the virtual data center functionality of the cloud service request. A virtual data center refers to functions of the cloud computing system invoked to simulate or virtualize a data center on behalf of a requesting entity.

Figure 3:
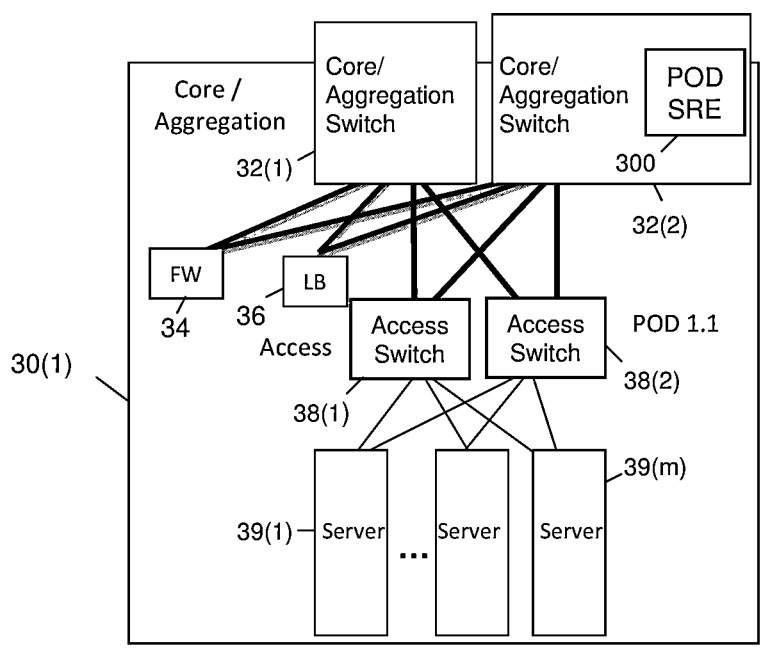
FIG. 3 is an example of a diagram depicting a network view from the perspective of a service rendering engine in a POD hierarchical level.

The network view from the perspective of the POD service rendering engine 300 of POD 30(1) is shown in FIG. 3. The POD service rendering engine 300 is responsible for placing the remainder of the policy-based cloud service request in specific cloud elements within the POD, and rendering and provisioning the cloud service across those elements.

Figure 4:
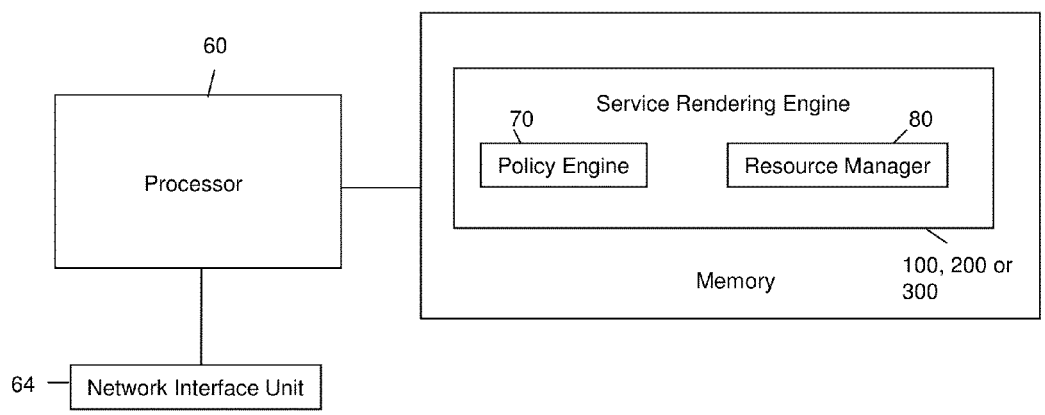
FIG. 4 is an example of a block diagram of a device, such as a switch, that is configured to perform service rendering engine operations as part of the distributed hierarchical rendering and provisioning of cloud services techniques.

Referring now to FIG. 4, an example of a block diagram of a device that is configured with a service rendering engine is now described. This device may be a processing element 12(1)-12(4) in the network level 10, an edge switch, e.g., edge switches 22(1) and/or 22(2) in data centers 20(1) and 20(2), core/aggregation switch, e.g., core/aggregation switches 32(1) and/or 32(2) in PODs 30(1)-30(n) and core/aggregation switches 42(1) and/or 42(2) in POD 40, or any network appliance device that is capable of communicating with other elements in a given hierarchical level. In the device, there is a processor 60, a memory 62 and a network interface unit 64. The memory 62 stores instructions for a service rendering engine. When the device is configured to be deployed in the network level, the instructions stored in the memory 62 are for a network service rendering engine 100. When the device is configured to be deployed in a data center, the instructions stored in the memory 62 are for a data center service rendering engine 200. When the device is configured to be deployed in a POD, the instructions stored in the memory 62 are for a POD service rendering engine 300. A service rendering engine 100, 200 and 300 includes instructions for a policy engine 70 and a resource manager 80, which are described further hereinafter. The network interface unit 64 is configured to perform communications (transmit and receive) over a network in order to communicate with other cloud elements and their embedded service rendering engine or abstract device broker.

Figure 5:
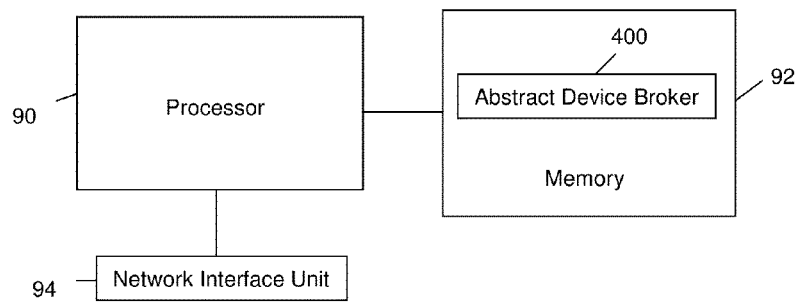
FIG. 5 is an example of a block diagram of a device that is configured to perform abstract device broker operations as part of the distributed hierarchical rendering and provisioning of cloud services techniques.

FIG. 5 shows an example of a block diagram of an element that resides in the cloud computing system 5 that is configured to respond to commands from a service rendering engine. Thus, FIG. 5 shows a simplified block diagram of what is referred to herein as a "cloud element". The cloud element comprises a processor 90, memory 92 and network interface device 94. The memory 92 stores instructions for an abstract device broker 400. The network interface 94 is configured to perform communications (transmit and receive) over a network in order to communicate with other cloud elements and their embedded service rendering engine.

The memory 62 and memory 92 shown in FIGS. 4 and 5 is, for example, random access memory (RAM), but may comprise electrically erasable programmable read only memory (EEPROM) or other computer-readable memory in which computer software may be stored or encoded for execution by the processor 60 and 90, respectively. The processors 60 and 70 shown in FIGS. 4 and 5 are configured to execute instructions stored in their associated memories for carrying out the techniques described herein. In particular, the processor 60 is configured to execute program logic instructions (i.e., software) stored or encoded in memory 62 for service rendering engine 100 comprising the policy engine 70 and resource manager 80. Similarly, the processor 90 is configured to execute program logic instructions (i.e., software) or encoded in memory 92 for the policy agent 400.

The operations of processors 60 and 90 may be implemented by logic encoded in one or more tangible media (e.g., embedded logic such as an application specific integrated circuit, digital signal processor instructions, software that is executed by a processor, etc). The service rendering engine 100 may take any of a variety of forms, so as to be encoded in one or more tangible media for execution, such as fixed logic or programmable logic (e.g. software/computer instructions executed by a processor) and the processor 60 may be an application specific integrated circuit (ASIC) that comprises fixed digital logic, or a combination thereof. For example, the processor 60 may be embodied by digital logic gates in a fixed or programmable digital logic integrated circuit, which digital logic gates are configured to perform the operations of the service rendering engine 100. In one form, the service rendering engine 100 is embodied in a one or more processor or computer-readable storage media or memory medium (memory device 62) that is encoded with instructions for execution by a processor (e.g. a processor 60) that, when executed by the processor, are operable to cause the processor to perform the operations described herein in connection with service rendering engine 100. Similar configurations are also possible for the processor 90 and the policy agent 400 stored in memory 92.

Policy rendering and provisioning is accomplished by communicating applicable subsets of the policy-based cloud service request from service rendering engines to cloud elements. Within each cloud element, the policy agent is responsible for receiving the policy subsets and converting the policy-based information into that cloud element's internal configuration to perform the desired function in that cloud element. This takes the place of traditional network management configuration interfaces, relieving the service rendering engines from the task of policy transformation into various configuration interfaces and models.

Figure 6:
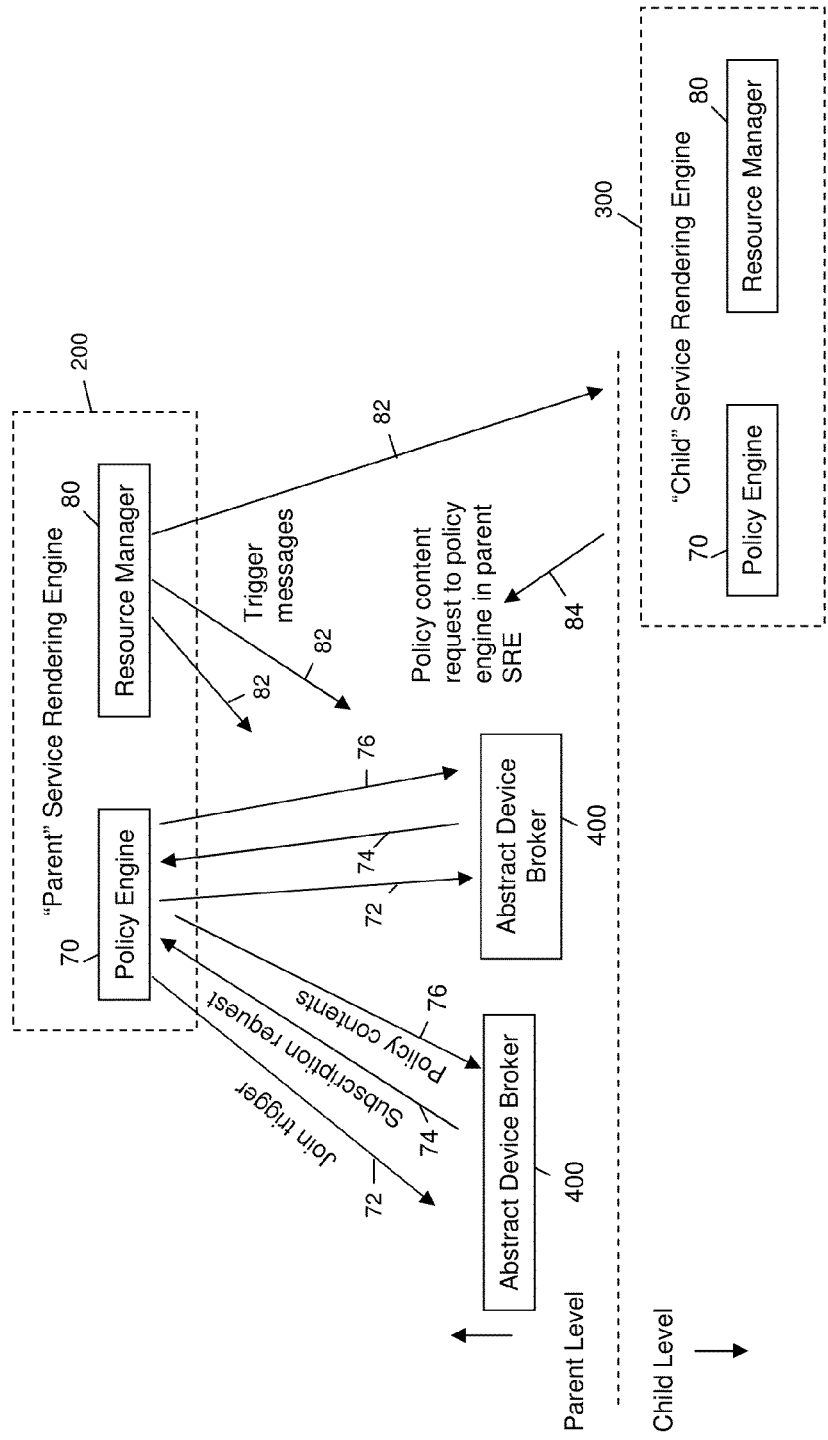
FIG. 6 is a diagram that shows an example of interactions between a parent service rendering engine and abstract device brokers in cloud elements in the parent level, and between the parent service rendering engine and a child service rendering engine.

Reference is now made to FIG. 6. In one implementation, abstract device brokers 400 are first triggered to join in a particular instantiation of cloud services by the service rendering engine 200 for that hierarchical level. This is shown by the arrows 72 in FIG. 6. The abstract device brokers 400 then subscribe to the policy for that set of cloud services by sending a subscription request shown at arrows 74 to the policy engine 70. Initially, this causes the policy engine 70 to push the relevant policy to the policy agent as the subscriber. Subsequently, whenever the subscribed policy is modified explicitly or implicitly, the policy engine 70 pushes the modified policy information to all abstract device brokers that have subscribed to that particular policy. One specific method for implementation of publish/subscribe functionality for policy acquisition by abstract device brokers involves the use of the eXtensible Messaging and Presence Protocol (XMPP).

The resource manager 80 makes the placement decision and triggers the policy agent in a cloud element or the resource manager 80 in a child service rendering engine, informing them that they have been selected to satisfy a policy-based cloud service request. The trigger message, shown at 82 in FIG. 6, includes an identification of the corresponding policy. At 84, the abstract device brokers 400 and/or resource manager 80 in the child service rendering engine 300 then request the policy contents from the policy engine 70 within the parent service rendering engine 200, which responds to the requests with the policy contents as shown at 76 in FIG. 6.

The policy subset represents rendering and provisioning commands or information for a given policy agent in a given cloud element. When a service rendering engine sends rendering and provisioning commands to a policy agent, it sends rendering and provisioning subset information derived from a received cloud service request. The rendering and provisioning subset information comprises information that enables a policy agent to configure one or more functions of the device that receives the information. The rendering and provisioning subset information is different depending on the nature and general function of the device, i.e., firewall, load balancer, access switch, server, edge switch, core/aggregation switch, etc., and the function that the device is to perform in order to satisfy the overall virtual data center to be established according to the cloud service request.

Figure 7:
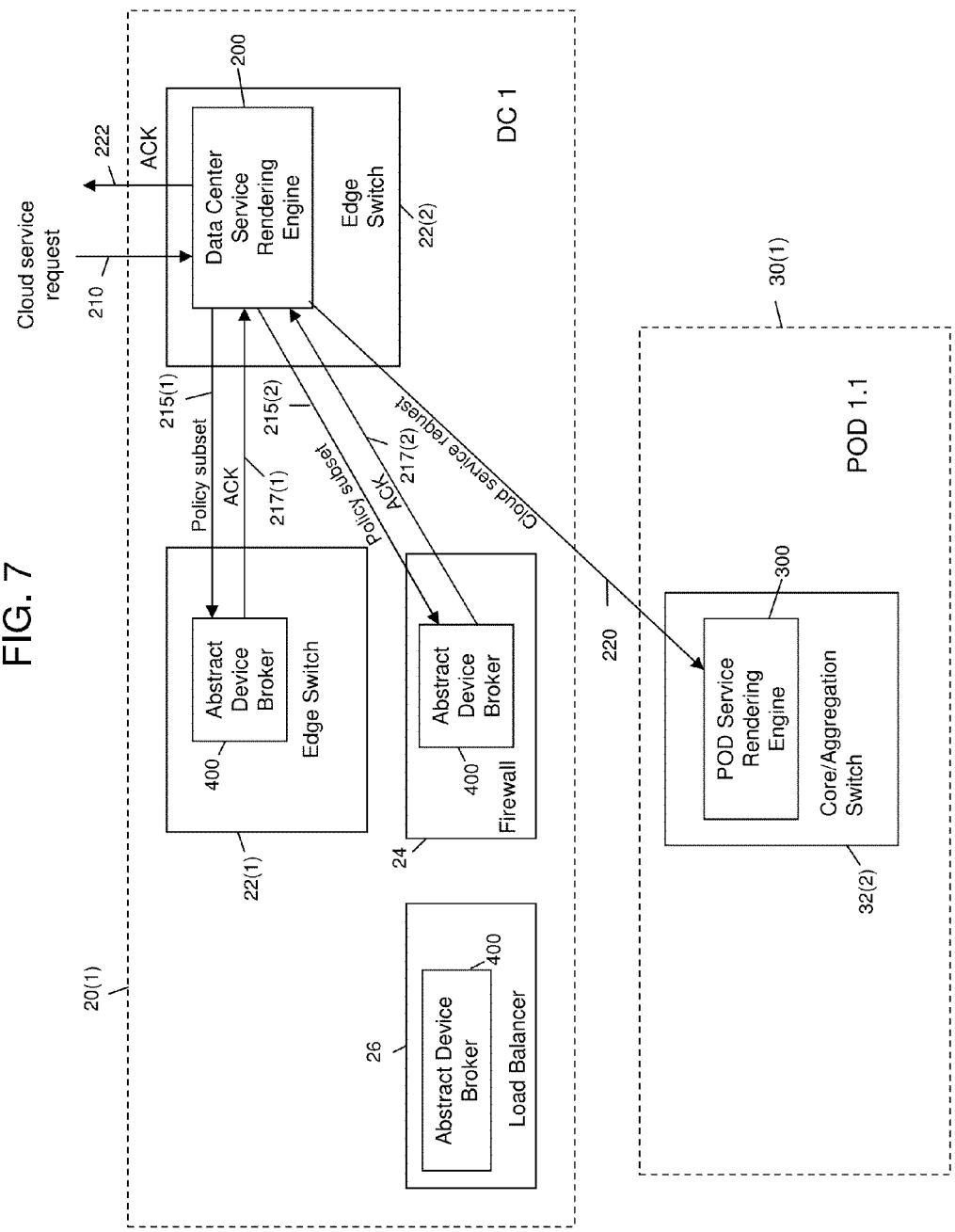
FIGS. 7 and 8 depict an example of "top down" control signaling between a data center service rendering engine and a POD service rendering engine.
Figure 8:
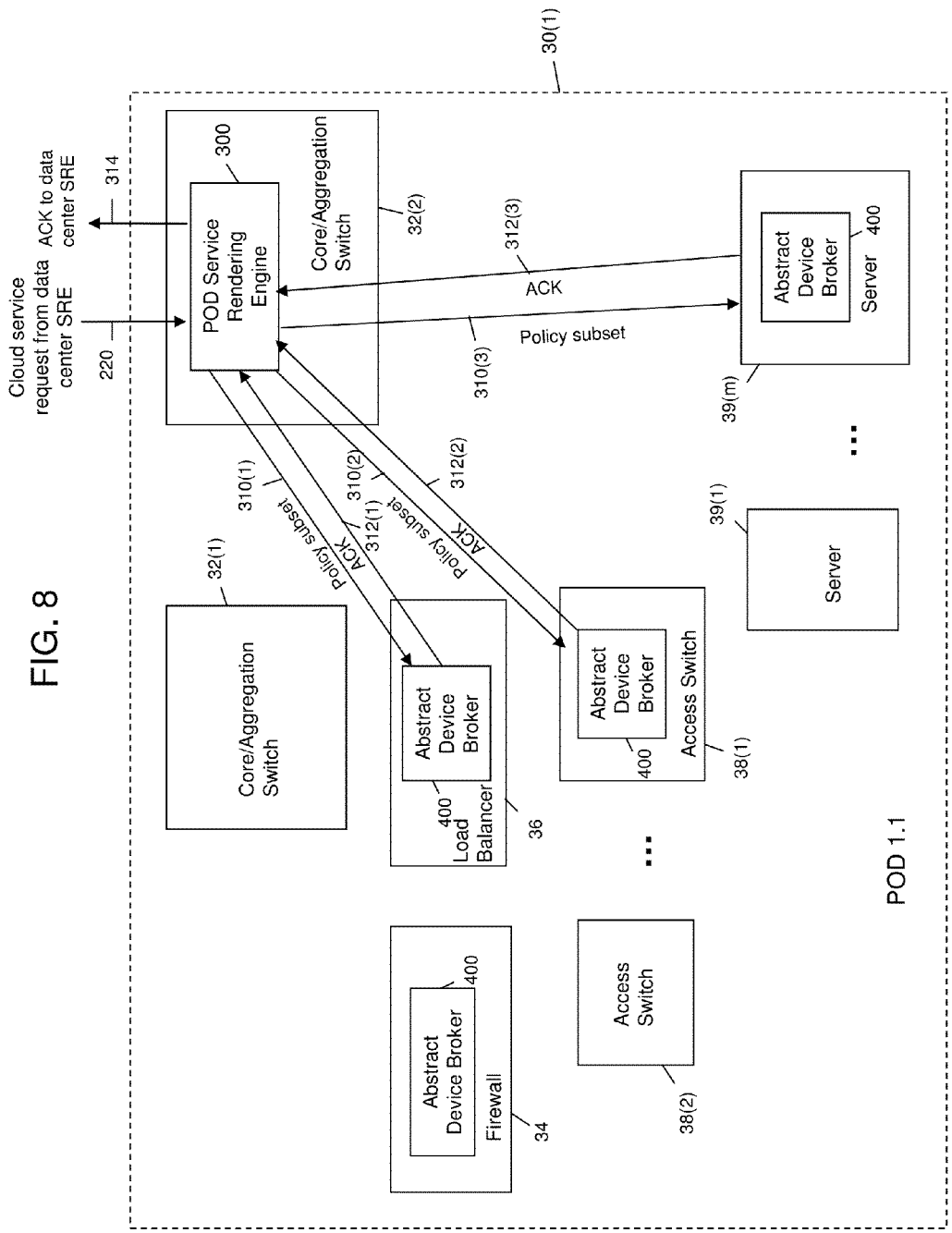

Reference is now made to FIGS. 7 and 8. These figures show a "top down", also called "early bound", flow for establishment of a virtual data center in response to a policy-based cloud service request. In the "early bound" or "top down" flow, rendering and provisioning of the virtual data centers proceeds in a top down fashion. A policy-based cloud service request is received at a higher level domain that makes placement decisions and renders and provisions the virtual data center throughout its domain before passing the policy-based cloud service request to a child domain. In the following descriptions of FIGS. 7-10, operations with reference numerals in the 200's are operations of a data center service rendering engine 200 and operations with reference numerals in the 300's are operations of a POD service rendering engine 300. Moreover, operations with reference numerals in the 400's are operations of a policy agent 400.

At 210, a policy-based cloud service request is received by the data center service rendering engine 200. This request may originate from the NMS 50 shown in FIG. 1, for example. The data center service rendering engine 200 makes a placement decision, determining which POD or PODs the virtual data center should be established in, and also determining which aspects of the cloud service request may be satisfied in the data center level itself. In the example shown in FIG. 7, the data center service rendering engine 200 selects a data center edge switch 22(1) to provide connectivity for the virtual data center being established, and selects a firewall device 24 hanging off that data center edge switch 22(1). When the data center service rendering engine makes the determination as to which aspects of the cloud service request are to be satisfied by cloud elements in the POD hierarchical level, it does so without knowledge of details of the placement, rendering and provisioning of cloud elements in the POD hierarchical level. The data center service rendering engine 200 leaves those POD level details to the POD service rendering engine 300 as described hereinafter.

At 215(1) and 215(2), the data center service rendering engine 200 communicates with the abstract device brokers 400 for all selected cloud elements, e.g., edge switch 22(1) and firewall device 24, within the data center domain in order to provide these cloud elements with the applicable policy rendering and provisioning subset information. At 217(1) and 217(2), the abstract device brokers 400 within the data center domain acknowledge receipt of the policy subsets to the data center service rendering engine 200.

At 220, the data center service rendering engine 200 progresses the policy-based cloud service request to the POD service rendering engine 300 for the selected POD, shown as POD 30(1) in this example. Again, the data center service rendering engine 200 may have multiple processing domains (e.g., PODs) to choose from and it selects one or more of these processing domains depending on the nature of the cloud service request. The cloud service request sent at 220 from the data center service rendering engine 200 to the POD service rendering engine 300 is a subset of the cloud service request received at 210 at the data center service rendering engine 200 because the cloud service request sent at 220 consists of those aspect of the cloud service request at 210 that the data center service rendering engine 200 determines to be satisfied by cloud elements in the POD hierarchical level 30 rather than in the data center hierarchical level 20. The subset cloud service request may be a filtered or marked version of the original cloud service request, as explained above.

Reference is now made to FIG. 8 for the rest of the "top down" flow. In response to receiving the policy-based (subset) cloud service request from the data center service rendering engine at 220, the POD service rendering engine 300 makes a placement decision, determining which cloud elements within the POD domain should be used to establish the requested virtual data center. In this example, the POD service rendering engine 300 selects a load balancer 36, an access switch 38(1), and a server 39(m). Thus, the POD service rendering engine 300 selects one or more cloud elements in its domain (in the POD hierarchical level) to satisfy the (subset) cloud service request received at 220.

At 310(1)-310(3), the POD service rendering engine communicates with the abstract device brokers for all selected cloud elements within the POD domain in order to provide each such cloud element with the applicable rendering and provisioning commands, e.g., rendering and provisioning policy subset information derived from the subset cloud service request at 220. At 312(1)-312(3), the abstract device brokers within the POD domain acknowledge (ACK) receipt of the policy subsets to the POD service rendering engine 300.

In response to receiving acknowledgments from the POD elements 36, 38(1) and 39(1), at 314 the POD service rendering engine 300 sends an acknowledgement to the data center service rendering engine 200.

Referring back to FIG. 7, at 222, the data center service rendering engine 200 sends an acknowledgement to the network management station that sent the initial policy-based cloud service request at 210. In one implementation, operations 215(1)-215(3) and 310(1)-310(3) may involve a handshake rather than a unidirectional message containing the applicable policy subset.

Figure 9:
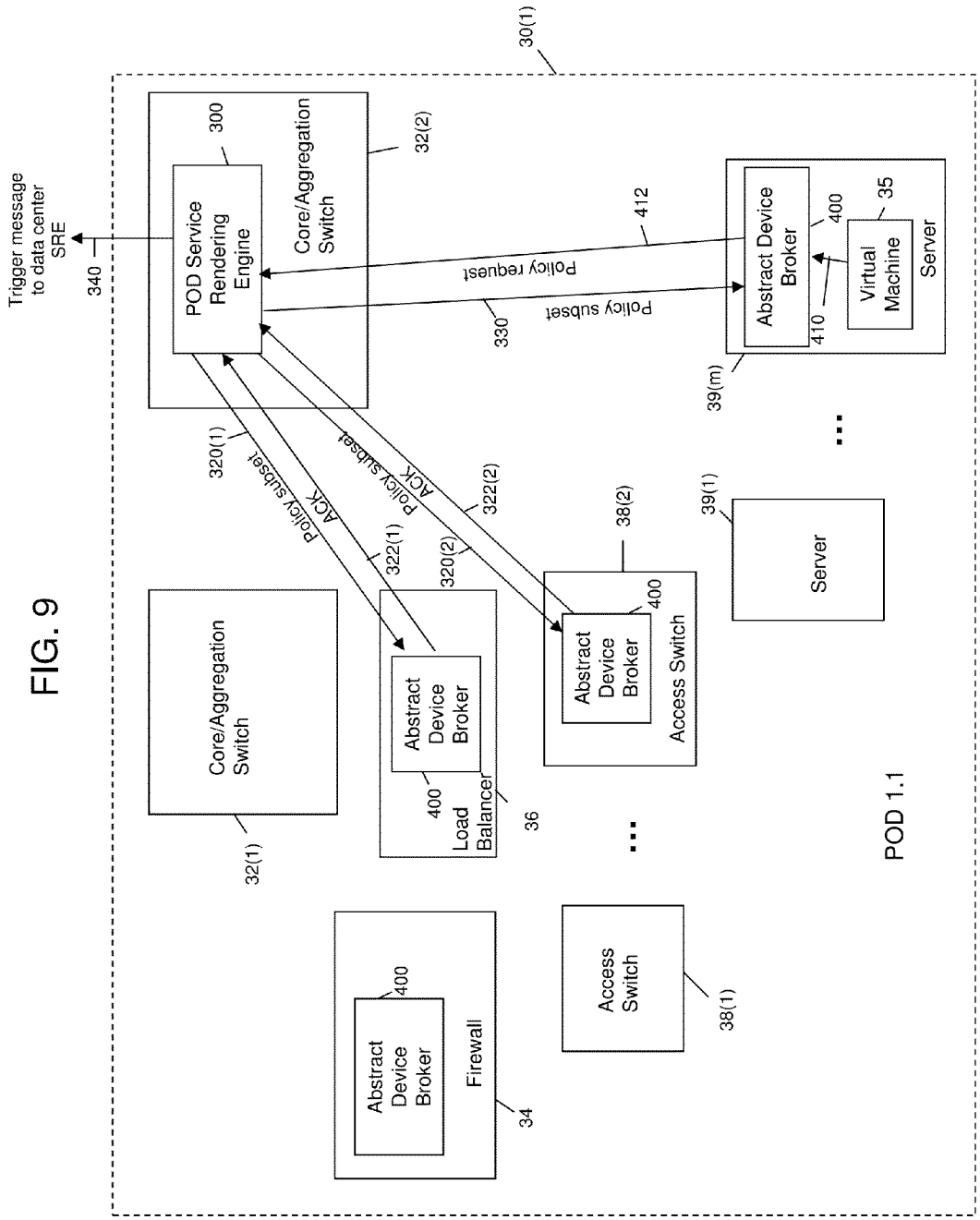
FIGS. 9 and 10 depict an example of "bottom up" control signaling between a POD service rendering engine and a data center service rendering engine.
Figure 10:
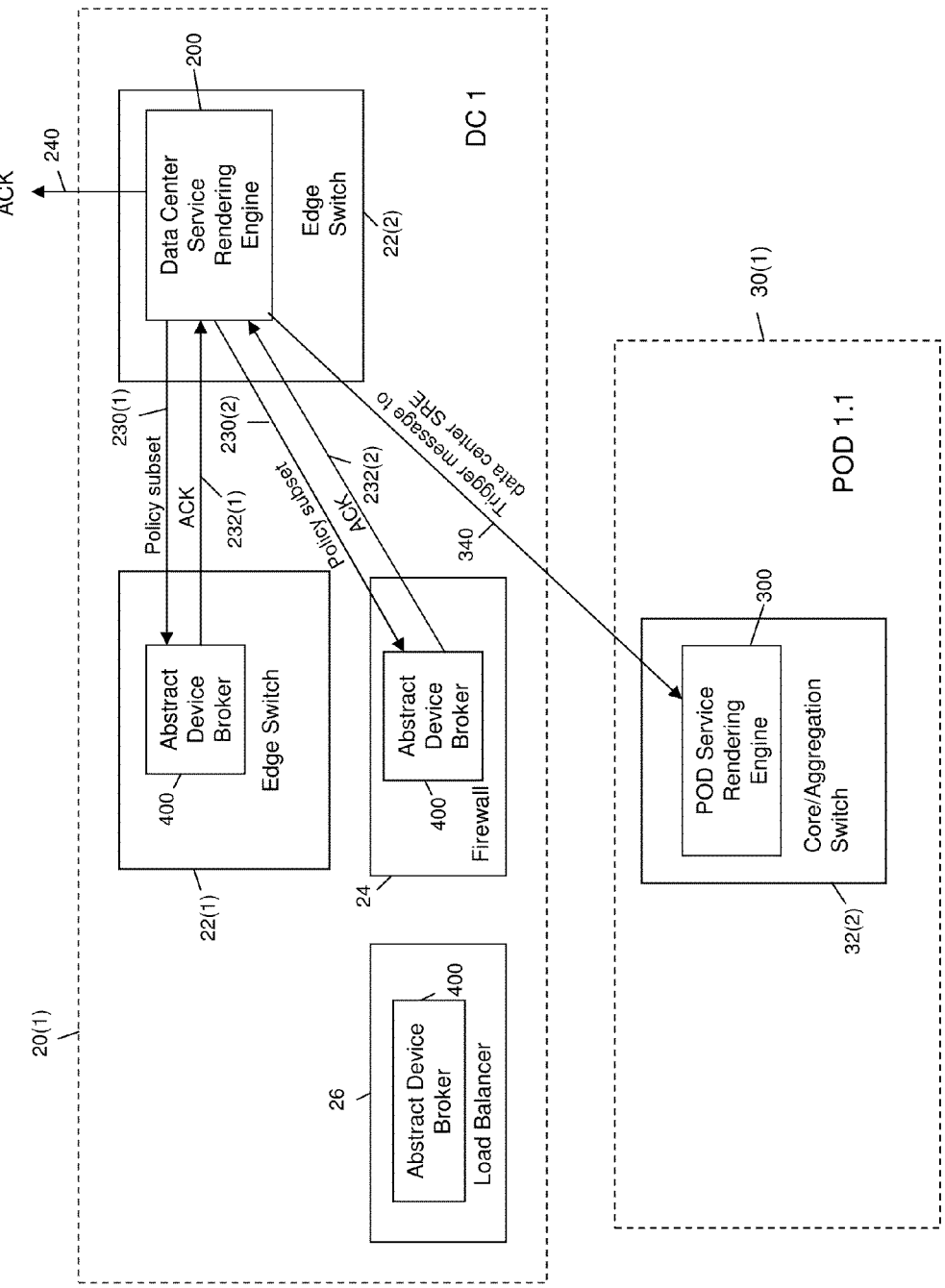

Reference is now made to FIGS. 9 and 10 for a description of a "late bound" or "bottom up" flow for rendering and provisioning of the virtual data center. In the "late bound" or "bottom up" flow, rendering and provisioning of the virtual data center are delayed so that they do not occur in direct response to the policy-based cloud service request, but instead they proceed in a bottom up fashion. Some time after receipt of the policy-based cloud service request, a virtual machine comes up in a server in one of the lowest levels. This triggers a notification to the policy agent in that server, e.g., server 39(m).

At 410, a policy agent in a server in POD 30(1), e.g., server 39(m), detects that a virtual machine 35 comes up (goes active) on the server 39(m). The activation of the virtual server in the server 39(m) triggers a notification to the policy agent 400 in that server 39(m). At 412, the policy agent 400 in server 39(m) requests a policy from the POD service rendering engine 300. Again, the activation of the virtual machine 35 is in response to a policy-based cloud service request for establishing a virtual data center, but the activation of the virtual machine 35 occurs some time after receipt of the policy-based cloud service request. The cloud service request may still be received at a service rendering engine at any hierarchical level.

In response to receiving the policy request from the policy agent 400 in the server 39(m) where the virtual machine 35 went active, the POD service rendering engine 300 makes a placement decision, determining which cloud elements within the POD domain should be used to establish the requested virtual data center. In this case, the POD service rendering engine 300 selects a load balancer 46 and an access switch 38(2).

At 320(1) and 320(2), the POD service rendering engine communicates with the abstract device brokers 400 for all selected cloud elements within the POD domain, e.g., load balancer 36 and access switch 38(2), in order to provide each such cloud element with the applicable policy subset for rendering and provisioning. At 322(1) and 322(2), the abstract device brokers 400 within the POD domain acknowledge receipt of the policy subsets to the POD service rendering engine.

At 330, the POD service rendering engine 300 provides the applicable policy subset to the policy agent 400 that triggered POD rendering and provisioning.

At 340, the POD service rendering engine 300 triggers the data center service rendering engine 200. Referring now to FIG. 10, the data center service rendering engine 200 makes a placement decision, determining which cloud elements within the data center domain should be used to establish the requested virtual data center. In this example, the data center service rendering engine 200 selects a data center edge switch 22(1) to provide connectivity to the virtual data center being established, and selects a firewall device 24 hanging off that data center edge switch 22(1).

At 230(1) and 230(2), the data center service rendering engine 200 communicates with the abstract device brokers for all selected cloud elements within the data center domain in order to provide each such cloud element with the applicable policy subset for rendering and provisioning. At 232(1) and 232(2), the abstract device brokers 400 within the data center domain acknowledge receipt of the policy subsets to the data center service rendering engine 200.

At 240, the data center service rendering engine 200 sends an acknowledgement in response to the initial policy-based cloud service request.

In one implementation, operations 320(1)-320(3) and operations 230(1) and 230(2) involve a handshake rather than a unidirectional message containing the applicable policy subset.

Figure 11:
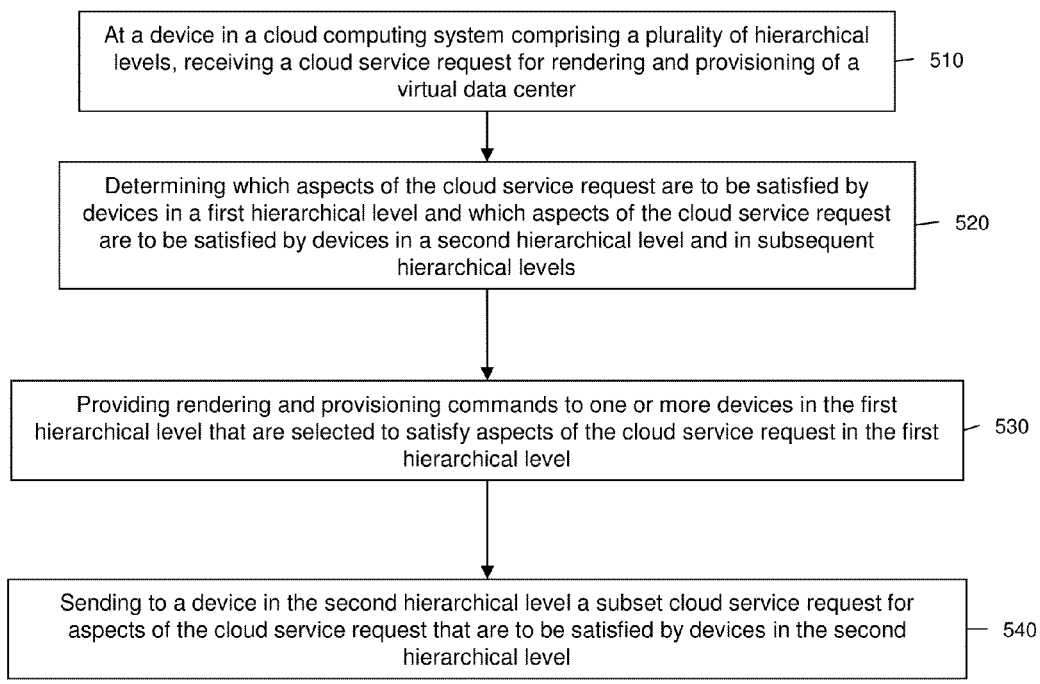
FIG. 11 is an example of a generalized flow chart depicting operations performed by a service rendering engine when it receives a cloud service request.

Reference is now made to FIG. 11. FIG. 11 shows a flow chart that depicts operations of any of the service rendering engines 100, 200 or 300, and applies generally to a "top down" flow of FIGS. 7 and 8 or a "bottom down" flow of FIGS. 9 and 10. Moreover, the operations of the flow chart shown in FIG. 11 begin when a service rendering engine receives a cloud service request, and again, the service rendering engine may be in any of a plurality of hierarchical levels in a cloud computing system. In FIG. 11 and the following description thereof, the service rendering engine that receives the cloud service request is referred to as a "first" service rendering engine in a first hierarchical level, which is completely arbitrary and could refer to a service rendering engine in any of the plurality of hierarchical levels. Likewise, the "second" service rendering engine referred in FIG. 11 and the following description is in a second hierarchical level, which is completely arbitrary. The second hierarchical level may be the next "lower" hierarchical level with respect to the first hierarchical level. For example, the first hierarchical level is the data center level 20 and the second hierarchical level is the POD level 30. On the other hand, the second hierarchical level may be the next "higher" hierarchical level with respect to the first hierarchical level. For example, the first hierarchical level is the POD level 30 and the second hierarchical level is the data center level 20. The operations shown in FIG. 11 assumes that there is at least one service rendering engine in each of a plurality of hierarchical levels of a cloud computing system, where each service rendering engine is configured to make placement decisions, render and provision cloud elements in a given hierarchical level.

At 510, at a device in a cloud computing system comprising a plurality of hierarchical levels, receiving a cloud service request for rendering and provisioning of a virtual data center. For example, at a device that executes a first service rendering engine in a device in a first hierarchical level, a cloud service request for rendering and provisioning of a virtual data center is received. In one example, the cloud service request may be received from an outside entity, e.g., NMS 50 (FIG. 1). In another example, such as the "bottom up flow" described above in connection with FIGS. 9 and 10, the first service rendering engine receives a policy request sent by a policy agent in a server or from a (virtual) switch to which the server's virtual port connects to in which a virtual machine went active (in a delayed response to an outside cloud service request).

At 520, a determination is made as to which aspects of the cloud service request are to be satisfied by devices in a first hierarchical level and which aspects of the cloud service request are to be satisfied by devices in a second hierarchical level and in subsequent hierarchical levels. For example, the first service rendering engine determines which aspects of the cloud service request are to be satisfied by cloud elements (devices) in the first hierarchical level and which aspects of the cloud service request are to be satisfied by cloud elements (devices) in a second hierarchical level and in subsequent (other) hierarchical levels (either up or down in the hierarchy). When the first service rendering engine determines at 520 which aspects of the cloud service request are to be satisfied by devices in the second hierarchical level it does so without knowledge of details of placement, rendering and provisioning of devices in the second hierarchical level. In the case of the "bottom up" flow described above in connection with FIGS. 9 and 10, the determining operation at 520 is based on a policy request received from a policy agent in a server device in the first hierarchical level in which a virtual machine went active in delayed response to the cloud service request.

At 530, rendering and provisioning commands are provided to one or more devices in the first hierarchical level that are selected to satisfy aspects of the cloud service request in the first hierarchical level. For example, the first service rendering engine provides rendering and provisioning commands to one or more devices in the first hierarchical level that are selected by the first service rendering engine to satisfy aspects of the cloud service request in the first hierarchical level.

At 540, a subset cloud service request is sent to a device in the second hierarchical level for aspects of the cloud service request that are to be satisfied by devices in the second hierarchical level. For example, the first service rendering engine sends a subset cloud service request for aspects of the cloud service request that are to be satisfied by devices in the second hierarchical level to a second service rendering engine in a device in the second hierarchical level. As explained above, in one example the subset cloud service request is a forwarded version of the original cloud service request that has been filtered or otherwise portions of which are marked to indicate those aspects to be rendered by the second service rendering engine.

In sum, a mechanism is provided for distributed hierarchical rendering and provisioning of policy-based cloud service requests within and between data centers. Cloud service requests are satisfied by following the hierarchy in a top down or bottom up fashion, with a service rendering engine at each layer of the hierarchy responsible for placement, rendering, and provisioning at that level, then handing off to the next lower or higher level service rendering engine. Service rendering engines hand off subsets of the policy-based cloud service request to abstract device brokers resident on each cloud element for rendering and provisioning within each of those could elements. Each service rendering engine need only be capable of configuring and interfacing with cloud elements in its own processing domain of its hierarchical level and with the service rendering engines of its adjacent hierarchical levels.

The hierarchical and distributed control plane techniques describe herein provides vastly improved scalability. These techniques are useful for Cloud-Centric Networking (CCN) computing environments comprising numerous data centers with hundreds of thousands of servers per data center. Although one implementation involves three levels of hierarchy as described herein (POD level, data center level, and network level), these techniques may be employed for an arbitrary number of hierarchical levels, allowing customers to control the tradeoff between accuracy and scalability. These techniques render and provision policy on individual cloud elements by passing subsets of the policy-based cloud service request to abstract device brokers resident on each cloud element. This significantly simplifies service rendering engines and network management functionality by offloading policy transformation into various configuration interfaces and models, eliminating long implementation time lags between availability of new capabilities at network elements, and the ability of service rendering engines and network management stations to provision those new capabilities. Moreover, these techniques significantly reduce operational complexity by reducing the multiplicity of management interfaces and models required to render and provision cloud services.

The distributed hierarchical cloud services rendering and provisioning techniques described herein may be embodied in a method, an apparatus comprising a network interface unit and a processor configured to perform operations described herein, and/or computer-readable medium storing instructions that, when executed cause a processor to perform operations described herein.

In current cloud computing environments, hard failures require manual re-provisioning of services. Depending on the type of the failures, the service outage could be in the order of hours, days, or even weeks. Most of the disaster recovery mechanisms in cloud environments deal with preservation and replication of the data to multiple data centers. None of these methods provide automatic relocation of services. Rather, human intervention is required in order to manually re-provision devices in data centers.

Figure 12:
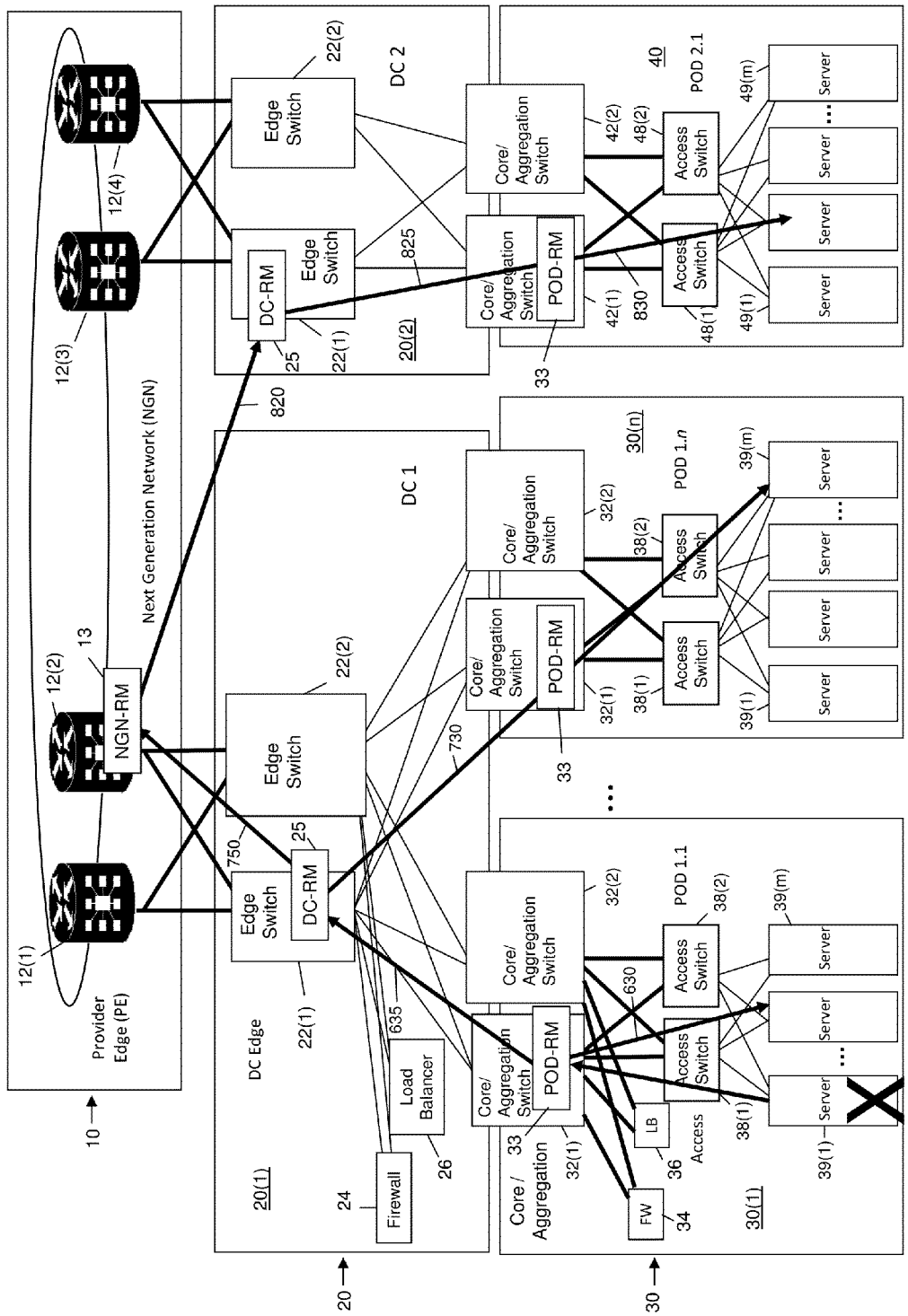
FIG. 12 is a diagram similar to FIG. 1 and showing how services associated with a device are automatically relocated.

Reference is now made to FIG. 12. The techniques described herein may be applied to failure management and disaster recovery events in a cloud computing system in order to automatically relocate services from failed devices/PODs/Data Centers. When a device in one of the plurality of hierarchical levels fails or otherwise become inoperable, a determination is made as to whether there are one or more other available devices within that hierarchical level to satisfy the operations of the failed device and if so rendering and provisioning commands are provided to those one or more other devices. Otherwise, a cloud service request is sent to a device in another hierarchical level (e.g., in a next higher or next lower level) which determines whether there are one or more available devices in that hierarchical level to satisfy the operations of the failed device.

FIG. 12 is similar to FIG. 1 except that a particular device, e.g., server 39(1) in POD 30(1) is indicated by the "X" in the figure as having failed or its services otherwise need to be moved. Such a device is referred to herein as an "impacted device" meaning that it is a device whose services need to be moved either due to failure, service/maintenance/upgrade or other reasons. A cloud computing system such as that shown in FIG. 12 may consist of hundreds of data centers with thousands of devices providing various services such as compute, storage, firewalls, load balancers, Service Wire, NAT, etc. All of these data centers are inter-connected at the network NGN level 10 containing thousands of routing nodes spanning to multiple geographies around the globe.

Failures can happen at many levels. Examples include:

Failure within a device (e.g., failure of active supervisor or route processor in a device).

Failure of entire device (e.g., power failure of the switch, router, physical compute server, or storage device);

Failure of entire POD (e.g., power failure to facility hosting entire POD);

Failure of entire Data Center (e.g., power grid failure hosting entire Data Center);

NGN level failure that isolates (or cuts off) the entire data from the rest of the cloud; and Bandwidth depletion that prevents any access in or out of POD or data center.

To deal with the majority of the failures, the service providers will have to locate alternative devices, PODs, or even Data Centers and re-provision the services to a different device, POD or Data Center. Manually relocating a service can impact thousands of customers and may take days or weeks before the services can be restored.

Automatic service relocation intervention techniques are provided using the Resource Manager (RM) function that is included in a service rendering engine at each level/domain of the cloud hierarchy. Examples of the RM function at the various hierarchical domains are described above. In addition, the RM identifies and relocates the services automatically without any human (user or customer) intervention. Again, the RM is hierarchical and resides in all domains of the cloud. That is, there is a NGN level Resource Manager (NGN-RM) shown at 13, Data Center level Resource Manager (DC-RM) 25 in each data center, and a POD level Resource Manager (POD-RM) 33 in each POD. Each of these RM components manages their respective domain. For example, each POD-RM 33 manages and moves/relocates failed resources within its POD, each DC-RM 25 manages/relocates all PODs within its data center as well as all other resources within data center (outside of POD resources) such as peripheral firewalls, etc. The NGN-RM 13 manages/moves data centers as well as the resources within the NGN level (outside of data centers). The devices in which the RM functionality resides or is performed are referred to herein as "management devices."

Services associated with one or more impacted devices may be relocated due to reasons other than failure. For example, as explained above, certain devices may require maintenance or upgrade and in order to perform that maintenance, the devices need to be shut down or taken off-line. In order to take the devices off-line, the services that they were providing need to be relocated to other devices in the cloud. Thus, the automatic relocating techniques described herein are applicable when there is a need to move the services of a cloud device for a variety of reasons not limited to failure of the device. The device to which the services are moved is referred to as a "replacement device."

Figure 13:
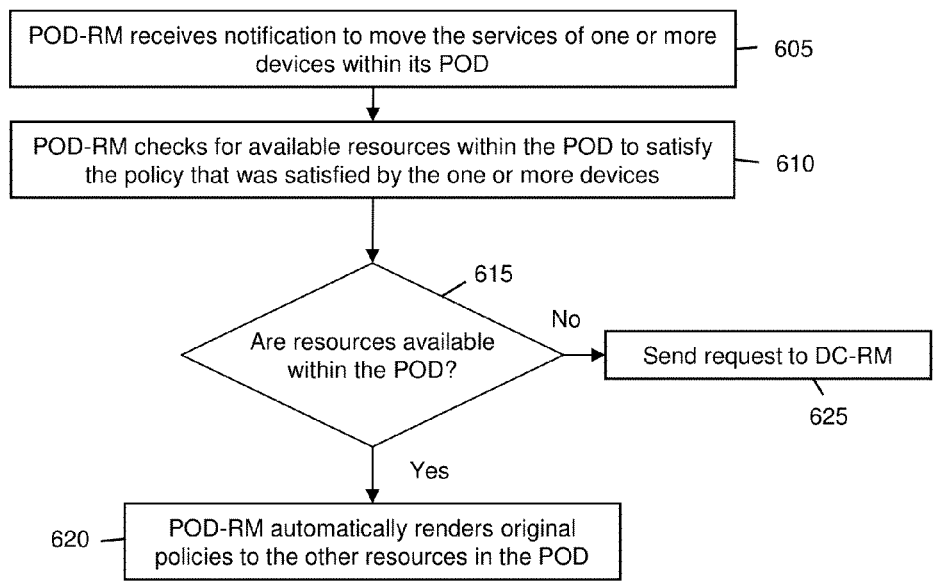
FIGS. 13-15 are flow charts depicting examples of operations that are performed by resource managers in the hierarchical cloud computing system to automatically relocate services associated with a failed device.
Figure 14:
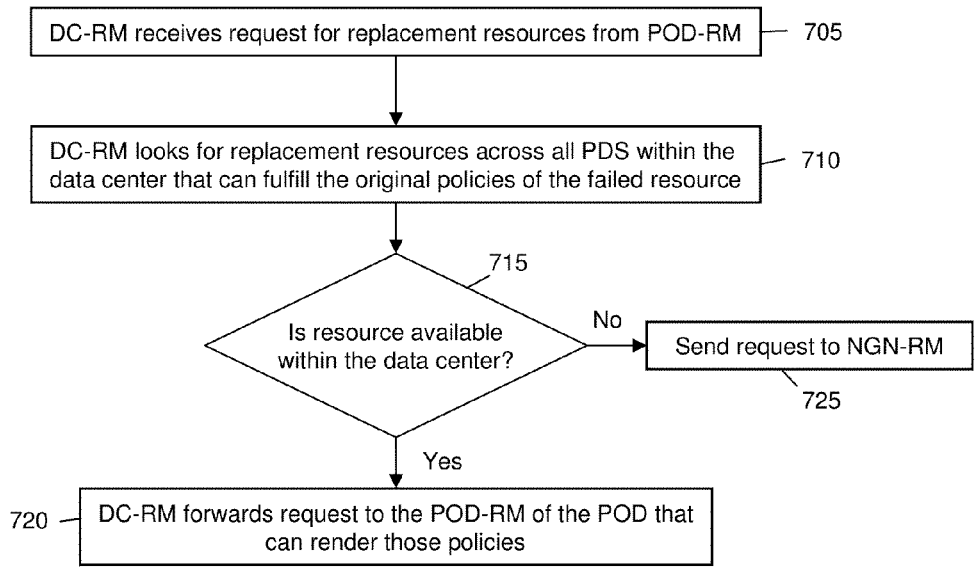
Figure 15:
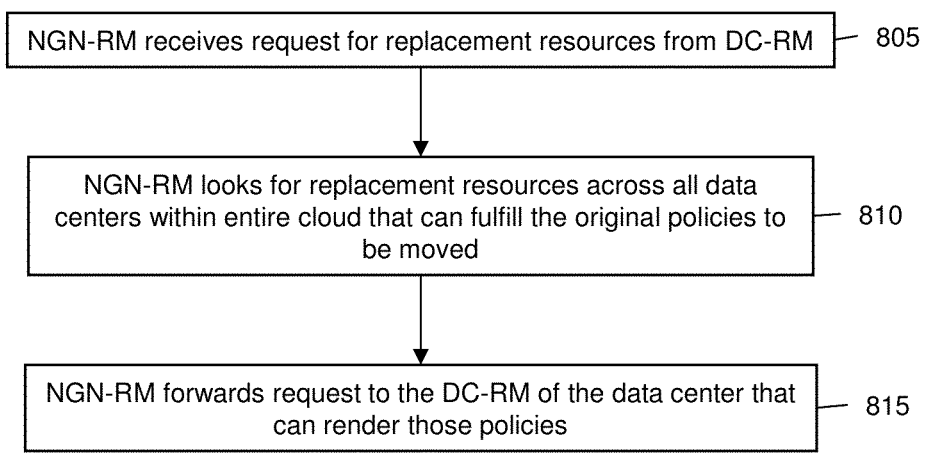

Reference is now made to FIGS. 13-15, with continued reference to FIG. 12, for a description of the operations of the RMs at the various hierarchical levels. FIG. 13 is a flow chart that depicts operations performed by a POD-RM (embodied in software executed by a management device in the POD, e.g., a core/aggregation switch) when services associated with an impacted device in a POD need to be moved. FIG. 14 is a flow chart that depicts operations performed by a DC-RM (embodied in software executed by a management device, e.g., a data center edge switch, in a data center) when it receives a notification of from a POD-RM of the need relocate the services of one or more impacted devices in a POD. FIG. 15 is a flow chart that depicts operations performed by the NGN-RM (embodied in software executed by a management device, e.g., a PE switch) when it receives a notification to relocate the services of impacted cloud devices. FIG. 12 shows an example in which the services of server 39(1) need to be moved due to failure, maintenance, upgrade, etc. Thus, server 39(1) is an example of an impacted device.

As explained above in connection with FIGS. 1-11, the RMs at each hierarchical level is aware of the capabilities of all the cloud devices within its respective level. A POD-RM is aware of all of the capabilities and capacity/availability of devices within its POD. A DC-RM knows all of the capabilities and capacity/availability of devices within its data center. The NGN-RM all of the capabilities and capacity/availability of devices within the entire cloud across all data centers.

Turning now to FIG. 13, when the services performed by an impacted device in a particular POD need to be moved, the POD-RM for that POD is notified, e.g., when there is a failure or when a maintenance or upgrade needs to be performed for one or more devices in the POD. At 605, the POD-RM receives the notification that the services associated with (performed by) one or more impacted devices in the POD need to be moved. The notification may indicate that the one or more impacted devices have failed or that the one or more impacted devices will become unavailable due to maintenance or upgrade, etc. At 610, the POD-RM checks for available replacement resources within the particular POD that can satisfy the policy that was satisfied by the one or more impacted devices. In other words, at 610, the POD-RM determines whether there are other replacement compute, storage or service node devices available in the particular POD to satisfy the operations performed by the one or more impacted devices. At 615, if the POD-RM determines that replacement resources are available, then at 620, the POD-RM renders the original policies of the one or more impacted devices to the identified replacement devices in the POD. This is shown by arrow 630 in FIG. 12. Thus, when the POD-RM determines that there are replacement compute, storage or service node devices in the particular POD available to satisfy the operations performed by the one or more impacted devices that are no longer capable of providing those services, the POD-RM automatically renders the replacement device or devices in the particular POD to perform the services. The operation 620 is performed automatically without any human intervention or involvement.

If at 615 the POD-RM determines that it cannot locate an appropriate replacement resource in its POD, at 625, the POD-RM sends the request to the DC-RM. This is shown by arrow 625 in FIG. 12. That is, when the POD-RM determines that there are no other replacement compute, storage or service node devices available in the particular POD to satisfy the services performed by the one or more impacted devices in the particular POD, the POD-RM sends a request to a management device that performs the DC-RM operations of a particular data center of which the particular POD is part.

Reference is now made to FIG. 14, with continued reference to FIG. 12. At 705, the DC-RM for a particular data center (of which the particular POD is a part) receives the request for replacement resources from the POD-RM in the particular POD. At 710, the DC-RM looks for replacement resources across all PODs within the data center to fulfill the services performed by the one or more impacted devices in the particular POD. In so doing, the DC-RM analyzes what it knows about the capabilities and availabilities of devices in all of the PODs, and at 715, determines whether there are compute, storage or service node devices available in one or more of a plurality of pods that are part of the particular data center that can perform the services of the one or more impacted devices in the particular POD.

If a suitable resource is available in the particular data center, then at 720, the DC-RM forwards the request to the POD-RM of the POD that can render those policies. The POD-RM that receives the request from the DC-RM then sends the rendering request to the replacement resource within the POD. This is shown by arrow 730 in FIG. 12 indicating that the DC-RM 25 of data center 20(1) sends a request to the POD-RM 33 of POD 30(2), which in turn renders server 39(m) in POD 30(n) to perform the services that were being performed by server 39(1) in POD 30(1). Thus, as depicted at 715 and 720, when the DC-RM determines that there are replacement compute, storage or service node devices available in other PODs of the particular data center to perform the services of the one or more impacted devices in the particular POD, the DC-RM sends a request to the management device that performs the POD-RM operations in the one or more pods in the particular data center, the request being configured to cause the POD-RM to automatically render the replacement compute, storage or service node device or devices to perform those services.

When at 715, the DC-RM determines that there are no replacement resources available in the particular data center to replace the operations of the one or more impacted devices in the particular POD, the DC-RM sends the request to a management device that runs the NGN-RM. This is shown by the arrow 750 in FIG. 12 indicating that DC-RM 25 of data center 20(1) sends a request to the NGN-RM 13.

Reference is now made to FIG. 15. At 805, the NGN-RM receives the request for replacement resources from the DC-RM. At 810, the NGN-RM looks for replacement resources across all data centers within the entire cloud that can fulfill the original policies of the one or more devices in the particular POD. That is, the NGN-RM determines whether there are replacement compute, storage or service node devices available in other data centers that can perform the operations of the one or more impacted devices in the particular POD that need to be moved. At 815, the NGN-RM forwards the request to the DC-RM for one of the plurality of data centers that has the replacement resources (compute, storage or service node devices) available to perform those services. When the DC-RM receives that request from the NGN-RM, it forwards the request to the POD-RM of the POD that has the replacement resources. The POD-RM then sends the rendering request to the replacement resource. This is shown by arrows 820, 825 and 830 in the FIG. 12, where the NGN-RM 13 sends a request to the DC-RM 25 of data center 20(2), and the DC-RM of data center 20(2) sends a request to the POD-RM 33 of POD 40, which in turn renders a server in POD 40.

The operations described above in connection with FIGS. 12-15 may be generalized as follows. A notification is received that services performed by an impacted device in a domain of a plurality of hierarchical domains need to be moved. A determination is made as to whether there are replacement resources available in the domain to perform the services, and if so, the replacement resources are automatically rendered to perform the services. The process continues to higher level domains that have a view into the capabilities of subordinate domains in order to determine where to move the services within the cloud computing system.

The automated failure recovery described above works for data center failures and relocations as well. An entire data center can fail or need to be moved for multiple reasons such as power grid failures, planned shutdown of a data center, planned upgrade or maintenance of a data center, a data center becomes cut off from the network for the failures in the network, and depletion of bandwidth in and out the data center edge switch. When a problem occurs that affects an entire data center, thousands of customers may be impacted because a given data center may be hosting thousands of virtual data centers (VDCs). A VDC is a set of processes performed by cloud resources for a set of data center operations such that a physical data center may host multiple data center operations, referred to as VDCs.

Figure 16:
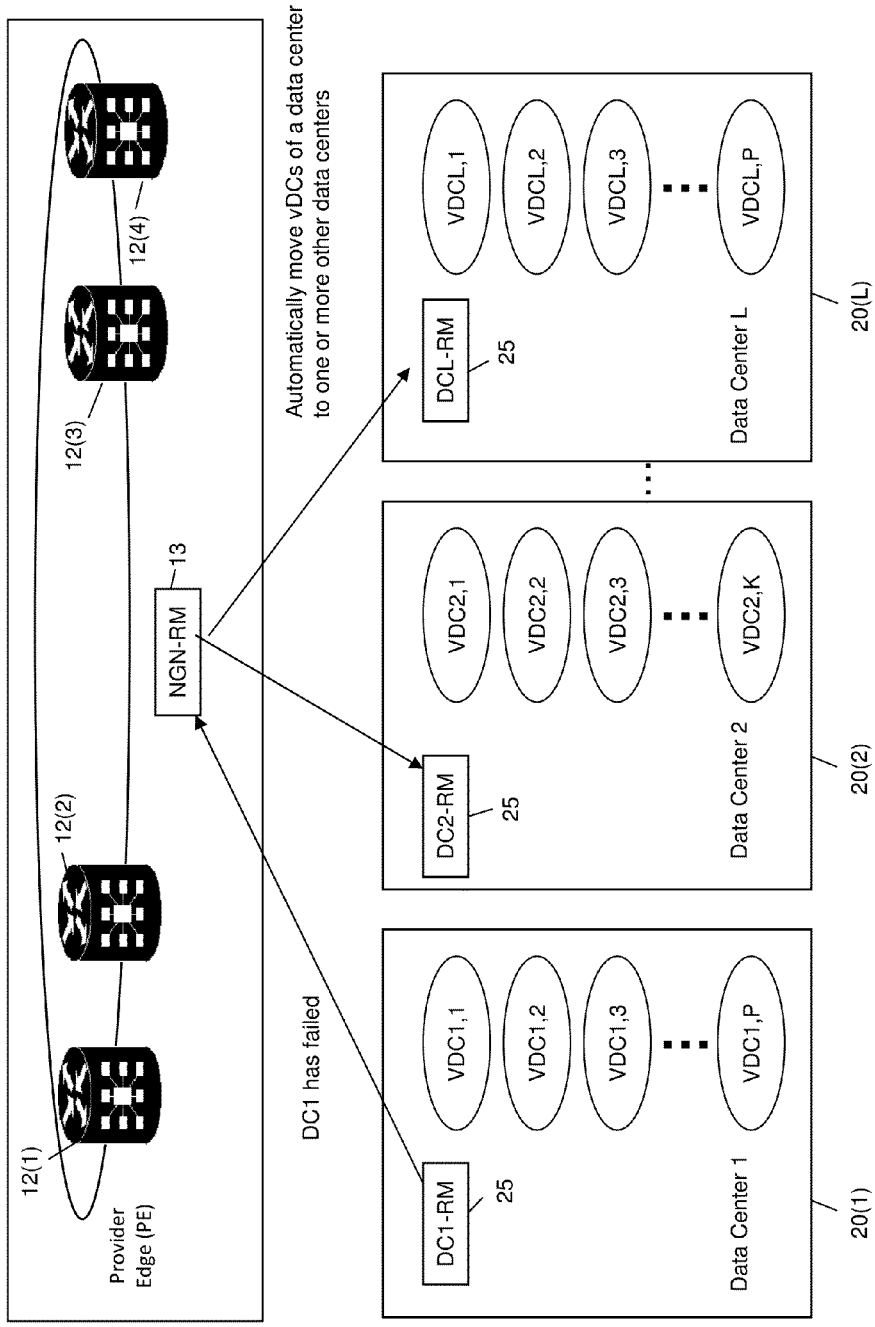
FIG. 16 is a diagram depicting an example of a cloud computing system configured to automatically move an entire data center.

Reference is now made to FIG. 16 that shows a plurality of data centers 20(1), 20(2), . . . , 20(L). The resources in each data center are used to perform operations of a plurality of virtual data centers. For example, data center 20(1) runs virtual data centers VDC1,1-VDC1,P, data center 20(2) runs virtual data centers VDC2,1-VDC2,K and data center 20(L) runs virtual data centers VDCL,1-VDCL,P. There is a DC-RM 25 for each data center, and each DC-RM 25 communicates with the NGN-RM 13 in the NGL level or domain. As shown in FIG. 16, the NGN-RM 13 is configured to automatically move VDCs of a data center to one or more other data centers. FIG. 16 does not show the POD levels or domains for simplicity, but it is understood that each data center comprises one or more PODs as depicted in FIGS. 1 and 12. In the example of FIG. 16, data center 20(1) is to be relocated and the NGN-RM 13 determines which ones of the other data centers 20(2)-20(L) are able to take on the VDCs of data center 20(1).

Figure 17:
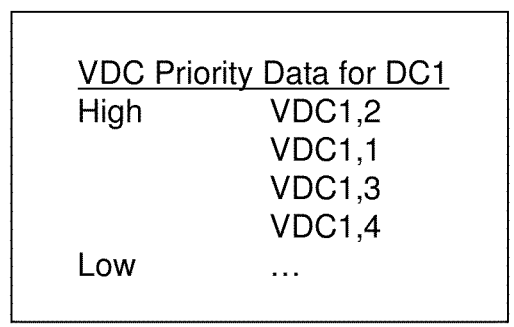
FIG. 17 is a diagram depicting data representing relative priority of virtual data centers associated with a data center to be moved.

Turning to FIG. 17, the VDCs of a data center may be assigned a priority that is used to determine which VDCs are relocated before other VDCs if the data center running those VDCs needs to be moved. For example, certain customers may subscribe to a higher level of service and in so doing are given higher priority for relocation of their VDCs over other customers who have subscribed to a lower level of service. In another example, certain VDCs may be used for more important functions (such as security or emergency response operations) and are to be given higher priority for relocation in the event of a data center relocation. In the example shown in FIG. 17, the DC-RM for data center 20(1) stores data indicating that VDC1,2 has a higher priority than VDC1,1, and so on. This data is made available to the NGN-RM 13 when it is relocating the virtual data centers of data center 20(1) so that it knows which higher priority VDCs to relocate before lower priority VDCs.

Figure 18:
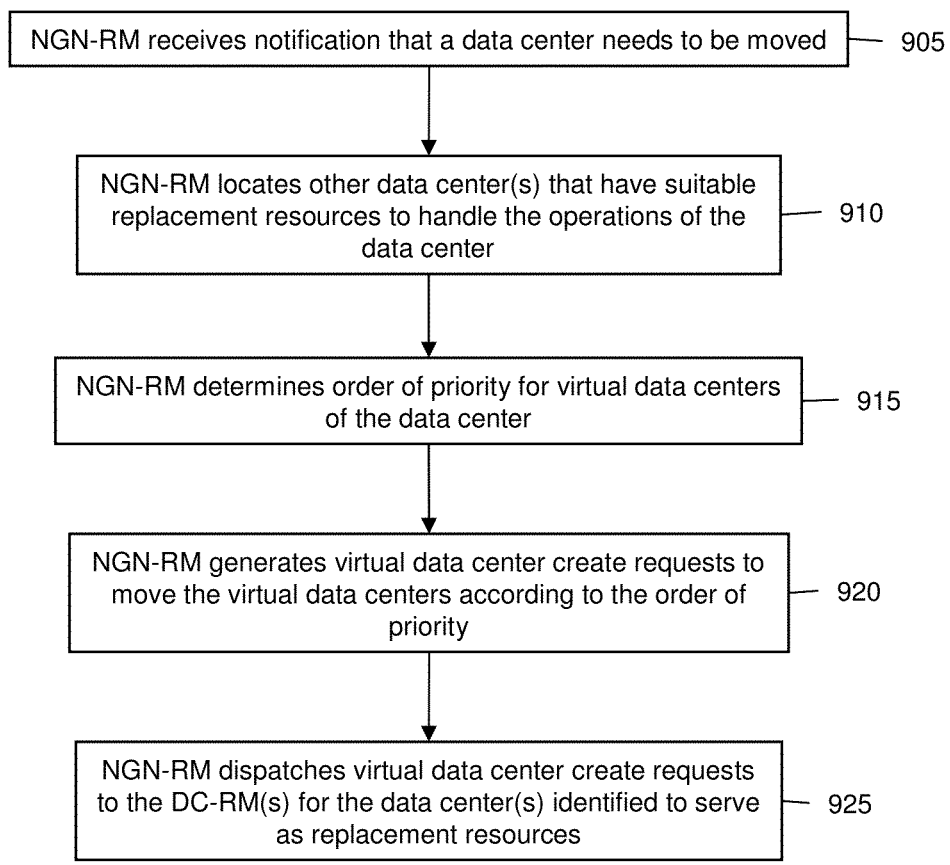
FIG. 18 is a flow chart depicting examples of operations performed to move an entire data center.

Referring now to FIG. 18, a flow chart is described that depicts operations of the NGN-RM 13 in connection relocating an entire data center. At 905, the NGN-RM receives a notification that a data center needs to be moved due to a failure, maintenance procedure, upgrade, etc. At 910, the NGN-RM determines whether another one or more of the plurality of data centers has resources available to handle the operations of the data center that needs to be moved. At 915, the NGN-RM determines an order of priority for a plurality of VDC operations of the data center. At 920, the NGN-RM generates virtual data center create requests to move the VDCs of the data center according to the order of priority. That is, higher priority VDCs are relocated before to lower priority VDCs. The NGN-RM thereby moves VDCs in a pre-specified order of priority, e.g., higher profile customer's VDCs before lower profile customers, based on configurable policy specified by the cloud service providers. At 925, the NGN-RM dispatches (automatically sends) the VDC requests to the one or more data centers which have replacement resources. As explained above, the NGN-RM 13 forwards the VDC create requests to another DC-RM, and that DC-RM forwards the request to one or more POD-RMs, which in turn renders the policies of replacement resources.

The techniques described herein provide automated failure and relocation management as well as disaster recovery in a cloud computing system. The hierarchical resource management operations are used to identify replacement resources and automatically move services from devices/POD/data centers. In so doing, the cloud infrastructure is highly available and resilient to single and multiple faults or changes within the cloud. Consequently, down time for customers and end-users is minimized. Recovery from the failures occurs without any manual human or other intervention by the provider of the cloud services. Again, moving a cloud service is automatic, either in response to failure or in order to free-up a device for maintenance or upgrade. After a maintenance or upgrade, the cloud service can be returned to that device. These techniques, whether for failure recovery or maintenance, provide substantial savings in management cost to the cloud computing service providers.

The techniques described herein may be in various forms, including a method, system, apparatus and computer readable storage or memory medium.

Accordingly, a method is provided comprising: in a cloud computing system comprising a plurality of hierarchical levels including a pod level, a data center level that comprises a plurality of pods and a next generation network level that comprises a plurality of data centers, wherein each pod comprises a plurality of compute, storage and service node devices, receiving a notification at a management device in a particular pod that performs pod level resource management operations for the particular pod, the notification indicating that services associated with one or more impacted devices in the particular pod need to be moved; determining whether there are replacement devices available in the particular pod to perform the services of the one or more impacted devices; and when it is determined that there are replacement devices in the particular pod available to perform the services of the one or more impacted devices, automatically rendering the one or more impacted devices in the particular pod to perform the services.

Moreover, a method is provided comprising: in a cloud computing system comprising a plurality of data centers each comprising a plurality of compute, storage and service node devices, receiving a notification at a management device that performs resource management operations for the plurality of data centers, the notification indicating that operations of a data center need to be moved; and determining whether another one or more of the plurality of data centers has resources available to satisfy the operations of the data center that need to be moved.

Further still, an apparatus is provided comprising: a network interface device configured to enable communications over a network; a processor coupled to the network interface device, the processor configured to: receive a notification that services performed by an impacted device in a domain of a plurality of hierarchical domains of a cloud computing system need to be moved; determine whether there are other replacement resources available in the domain to perform the services of the impacted device; and automatically render the other replacement resources in the domain to perform the services.

Similarly, one or more computer readable storage media encoded with instructions that when executed are operable to: receive a notification at a management device that performs resource management operations for a plurality of data centers in a cloud computing system, the notification indicating that operations of a data center need to be moved; and determine whether another one or more of the plurality of data centers has resources available to satisfy the operations of the data center that need to be moved.

The above description is intended by way of example only.
What is claimed is:

1. A method comprising:
   in a cloud computing system comprising a plurality of hierarchical levels including a pod hierarchical level, a data center hierarchical level that comprises a plurality of pods and a network hierarchical level that comprises a plurality of data centers, wherein each pod comprises a plurality of devices, receiving a notification at a pod management device in a first pod in a first data center, wherein the pod management device performs pod hierarchical level resource management operations for the first pod, the notification indicating that services associated with one or more impacted devices in the first pod need to be moved;
   determining whether there are one or more replacement devices available in the first pod to perform the services of the one or more impacted devices;
   when it is determined that there are one or more replacement devices in the first pod available to perform the services of the one or more impacted devices, automatically provisioning one or more replacement devices in the first pod to perform the services of the one or more impacted devices;
   when it is determined that there are no replacement devices in the first pod available to perform the services of the one or more impacted devices, sending a request to a data center management device at the data center hierarchical level;
   receiving the request at the data center management device of the first data center;
   wherein the data center management device automatically determines whether there are one or more replacement devices available in the plurality of pods other than in the first pod; and
   when it is determined that there are one or more replacement devices in a second pod available to perform the services of the one or more impacted devices, automatically provisioning the one or more replacement devices in the second pod to perform the services of the one or more impacted devices.

2. The method of claim 1, wherein the notification indicates that the one or more impacted devices in the first pod have failed.

3. The method of claim 1, where the notification indicates that the one or more impacted devices in the first pod will become unavailable due to maintenance.

4. The method of claim 1, wherein provisioning comprises rendering at least a portion of policies of the one or more impacted devices to the one or more replacement devices.

5. The method of claim 4, when it is determined that there are no replacement devices available in any other pods of the first data center, sending a request to a management device that performs network hierarchical level center resource management operations for the plurality of data centers.

6. The method of claim 5, and further comprising:
   receiving the request at the management device that performs network hierarchical level center resource management operations for the plurality of data centers; and
   determining whether there are one or more replacement devices available in other data centers that can perform the services of the one or more impacted devices in the first pod.

7. The method of claim 6, and further comprising forwarding a request to a management device that performs data center hierarchical level resource management operations for one of the plurality of data centers determined to have one or more replacement devices available to perform the services of the one or more impacted devices of the first pod.

8. The method of claim 7, and further comprising:
   at the management device that performs network hierarchical level resource management operations for the plurality of data centers, receiving a notification that one of the plurality of data centers needs to be moved; and determining whether another one or more of the plurality of data centers has resources available to handle the operations of the data center that needs to be moved.

9. The method of claim 8, and further comprising:

determining an order of priority for a plurality of virtual data center operations of the data center that needs to be moved; and generating requests to move the plurality of virtual data center operations to one or more other data centers according to the order of priority so that higher priority virtual data center operations are moved before lower priority virtual data center operations.

10. The method of claim 7, and further comprising automatically sending the requests to the management device that performs the data center hierarchical level resource management operations for the one or more data centers.

11. The method of claim 1, wherein receiving the notification at the management device in the first pod is during a provisioning process of devices in the first pod.

12. The method of claim 1, wherein automatically provisioning is performed without human interaction or involvement.

13. A method comprising:

in a cloud computing system comprising a plurality of data centers each comprising a plurality of devices, receiving a notification at a management device that performs resource management operations for the plurality of data centers, the notification indicating that operations of a data center need to be moved;

determining whether another one or more of the plurality of data centers has a corresponding management device that manages resources in the one or more data centers that are available to satisfy the operations of the data center that need to be moved;

determining an order of priority for a plurality of virtual data center operations of the data center that need to be moved; and generating requests to move the plurality of virtual data center operations to one or more other data centers according to the order of priority so that higher priority virtual data center operations are moved before lower priority virtual data center operations.

14. The method of claim 13, and further comprising automatically generating and sending a request to another one or more of the plurality of data centers determined to have resources available to satisfy the operations of the failed data center, wherein the request is configured to cause the corresponding management device that performs resource management operations for the other one or more data centers to automatically render the devices to perform the operations of the failed data center.

15. The method of claim 13, and further comprising automatically sending the requests to the management device that performs resource management operations for the one or more data centers.

16. An apparatus comprising:

a network interface device configured to enable communications over a network;

a processor coupled to the network interface device, the processor configured to:

receive a notification that services performed by an impacted device in a domain of a plurality of hierarchical domains of a cloud computing system need to be moved;

determine whether there is one or more replacement devices available in the domain to perform the services of the impacted device;

when it is determined that there are one or more replacement devices available in the domain, automatically provision the one or more replacement device in the domain to perform the services of the impacted device;

when it is determined that there are no replacement resources available in the domain to perform the services, automatically send a request to a management device that performs resource management operations at a higher hierarchical domain to identify other domains that may have resources available to perform the services;

when it is determined that there are resources available to perform the services in other domains, automatically provision the resources to perform the services of the impacted device.

17. The apparatus of claim 16, wherein instructions that are operable to automatically provision comprise instructions operable to render at least a portion of policies of the one or more impacted devices to the one or more replacement devices.

18. The apparatus of claim 16, wherein the instructions that are operable to receive comprise instructions operable to receive the notification indicating that the impacted device has failed.

19. The apparatus of claim 16, wherein the instructions that are operable to receive comprise instructions operable to receive the notification indicating that the services performed by the impacted device need to be moved for maintenance or upgrade purposes.

20. One or more non-transitory computer readable storage media encoded with instructions that when executed are operable to:

receive a notification at a management device that performs resource management operations for a plurality of data centers in a cloud computing system, the notification indicating that operations of a data center need to be moved;

determine whether another one or more of the plurality of data centers has a corresponding management device that manages resources in the one or more data centers that are available to satisfy the operations of the data center that need to be moved;

determine an order of priority for a plurality of virtual data center operations of the data center that need to be moved; and generate requests to move the plurality of virtual data center operations to one or more other data centers according to the order of priority so that higher priority virtual data center operations are moved before lower priority virtual data center operations.

21. The non-transitory computer readable storage media of claim 20, and further comprising instructions that are operable to automatically generate and send a request to another one or more of the plurality of data centers determined to have resources available to satisfy the operations of the failed data center, wherein the request is configured to cause the corresponding management device that performs resource management operations for the other one or more data centers to automatically render the devices to perform the operations of the failed data center.

* * * * *